US008520973B2

(12) United States Patent  (10) Patent No.: US 8,520,973 B2
Kim et al.  (45) Date of Patent: Aug. 27, 2013

(54) METHOD FOR RESTORING TRANSPORT ERROR INCLUDED IN IMAGE AND APPARATUS THEREOF

(75) Inventors: Jin Sul Kim, Daejeon (KR); Hyun Woo Lee, Daejeon (KR); Won Ryu, Daejeon (KR)

(73) Assignees: Electronics and Telecommunications Research Institute, Daejeon (KR); KT Corporation, Seongnam (KR)

( * ) Notice: Subject to any disclaimer, the term of this patent is extended or adjusted under 35 U.S.C. 154(b) by 813 days.

(21) Appl. No.: 12/639,186

(22) Filed: Dec. 16, 2009

(65) Prior Publication Data

US 2010/0158406 A1  Jun. 24, 2010

(30) Foreign Application Priority Data

Dec. 19, 2008 (KR) .................. 10-2008-0130644

(51) Int. Cl.
G06K 9/40 (2006.01)
H04N 9/64 (2006.01)
H04N 5/202 (2006.01)
H04N 1/40 (2006.01)

(52) U.S. Cl.
USPC ............ 382/275; 348/242; 348/254; 358/461

(58) Field of Classification Search
None
See application file for complete search history.

(56) References Cited

U.S. PATENT DOCUMENTS

| 8,150,103 B2 * | 4/2012 | Zhang et al. .................. 382/103 |
| 2005/0094889 A1 * | 5/2005 | Lin et al. ........................ 382/261 |
| 2006/0291695 A1 * | 12/2006 | Lipton et al. .................. 382/103 |
| 2007/0127774 A1 * | 6/2007 | Zhang et al. .................. 382/103 |

FOREIGN PATENT DOCUMENTS

| KR | 10-0243862 | 2/2000 |
| KR | 10-0574862 | 4/2006 |
| KR | 1020060089694 | 8/2006 |
| KR | 1020070006006 | 1/2007 |
| KR | 1020080045011 | 5/2008 |
| KR | 1020080048904 | 6/2008 |
| KR | 1020080060561 | 7/2008 |

* cited by examiner

Primary Examiner — Randolph I Chu
(74) Attorney, Agent, or Firm — Nelson Mullins Riley & Scarborough LLP

(57) ABSTRACT

In an image transmission error restoring method and an apparatus using the same, a received image frame is divided into a plurality of blocks and each block is divided through a multi-resolution process. After the multi-resolution process, an error-occurred region is searched and the searched error-occurred region is recovered based on information selected from among global pixel information and local pixel information according to complexity of each block.

13 Claims, 6 Drawing Sheets

METHOD FOR RESTORING TRANSPORT ERROR INCLUDED IN IMAGE AND APPARATUS THEREOF

CROSS-REFERENCE TO RELATED APPLICATION

This application claims priority to and the benefit of Korean Patent Application No. 10-2008-0130644 filed in the Korean Intellectual Property Office on Dec. 19, 2008, the entire contents of which are incorporated herein by reference.

BACKGROUND OF THE INVENTION (a) Field of the Invention

The present invention relates to a transmission error restoring method and an apparatus using the same. More particularly, the present invention relates to a method for restoring an original image by recovering an error occurring in an image transmitted for a media service, and an apparatus using the same.

(b) Description of the Related Art

Interest in IP media services has increased simultaneously with the advent of various convergence service environments where communication and broadcasting services are combined, and various IP-based multimedia application services are explosively coming out as the present network becomes an ALL-IP network.

Consequently, traffic in transmission control protocol/Internet protocol (TCP/IP) networks is rapidly increased thereby causing IP-based service quality degradation. In addition, since an IP network uses a best effort method that does not guarantee quality of service (QoS), image quality (it may be also called "video quality") at a receiving end may be degraded when an image packet is transmitted through the IP network. That is, quality of an original image transmitted from a transmitting side is changed due to various errors occurring in the original image so that the receiving side cannot reproduce the original image, and this phenomenon occurs frequently. For example, errors such as a packet loss, jitter, or out of order occur while the image is transmitted through the IP network, and the errors influence the image at the receiving side.

Therefore, developers of heterogeneous device communication systems and IPTV communication systems including a wired communication system, a wireless subscriber network, a mobile video phone network, a personal portable communication network, and a next generation mobile communication network are studying and researching the above-stated problem, and results have been issued together with activation of IPTV services. However, the image quality degradation still occurs in spite of such efforts, and methods for quickly and accurately checking the problem are unsatisfactory. In order to minimize the image quality degradation, a method for restoring lost information on an image in a transmission network has been suggested, but the lost information cannot be perfectly restored.

In addition, a method for restoring the lost image at an end terminal to recover the lost image information has been continuously researched, but the method restores the lost information under an assumption of real-time restoration and limited error types. However, various transmission errors occur in the IPTV service, and an image where the transmission error occurs does not have a fixed color so that the existing method that performs the restoration based on the limited condition is inappropriate.

In addition, IPTV is real-time broadcasting and 30 frames per second are changed for broadcasting an image service, so a fast restoration method is required for the real-time broadcasting that quickly and dynamically changes.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for restoring an original image by efficiently recovering errors that have occurred during image transmission in a communication environment that provides a image service, and an apparatus using the same.

An image error restoring method according to an exemplary embodiment of the present invention restores a transmission error included in a received image. The image error restoring method includes: dividing a frame of the received image into a plurality of blocks and searching for an error-occurred region of each block; determining complexity of texture of a block based on information of pixels forming the corresponding block, with respect to each block; and selecting one of global pixel information and local pixel information according to the determined complexity and recovering an error-occurred region included in a block based on the selected information, with respect to each block.

An apparatus according to another exemplary embodiment of the present invention restores a transmission error included in an image received at a communication environment where an IP media service is provided. The apparatus includes: an error region extractor that divides a frame of the image into a plurality of damage blocks, divides each of the damage blocks into image blocks, divides each of the image blocks into pixel blocks, and searches for a region where an error has occurred in each of damaged blocks; a determining unit that obtains a standard deviation of pixel values with respect to image blocks of each of the damaged blocks and determines complexity of the corresponding image block based on the standard deviation; and an error recovery unit that selects one of global pixel information and local pixel information and recovers an error-occurred region included in each of the image blocks based on the selected information.

DETAILED DESCRIPTION OF THE EMBODIMENTS

Figure 1:
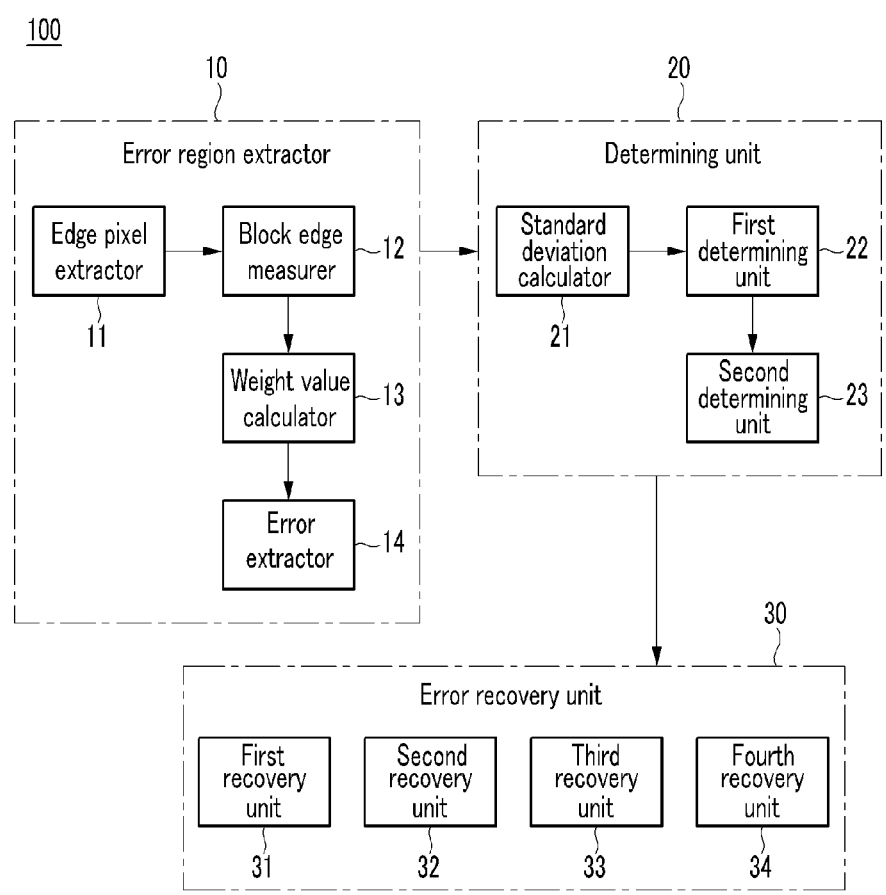
FIG. 1 is a configuration diagram of a transmission error restoring apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements An exemplary embodiment of the present invention will now be described in further detail with reference to the drawings.

In an exemplary embodiment of the present invention, in a method for restoring an image transmission error, and particularly in an image that is decoded and processed in a receiving end, a region that is damaged due to transmission error is restored by using surrounding pixel values. For this purpose, a received image frame is divided into a plurality of blocks and each block is divided again by performing a multi-resolution process, a region where an error occurs is detected, and then one of global pixel information and local pixel information is selected according to complexity of each block and the error-occurred region is recovered based on the selected information.

FIG. 1 is a configuration diagram of a transmission error restoring apparatus according to the exemplary embodiment of the present invention.

As shown in FIG. 1, a transmission error restoring apparatus 100 according to the exemplary embodiment of the present invention includes an error region extractor 10 that divides a frame of an image into a plurality of blocks and detects a region where an error occurs for each block, a determining unit 20 that obtains a standard deviation of pixel values for each block and determines complexity and an error occurrence degree (hereinafter referred to as a damage degree for convenience of description) of the corresponding pixel based on the standard deviation, and an error recovery unit 330 that selects one of global pixel information and local pixel information according to at least one of complexity and a damage degree of each block and recovers an error-occurred region in each block based on the selected information.

The error region extractor 10 includes an edge pixel extractor 11 obtaining edge pixels of each block, a block edge measurer 12 obtaining a gradient direction with respect to edge pixels of each block and obtaining a block edge pixel based on the gradient direction, a weight value calculator 13 calculating average brightness of at least one of surrounding pixels of the block edge pixel and calculating a weight value based on the average brightness, and an error extractor 14 adding the calculated weight value to the block edge pixel to define an error-occurred region.

The determining unit 20 includes a standard deviation calculator 13 calculating a standard deviation based on values of pixels that form the corresponding block with respect to each block that includes an error-occurred region defined by the error region extractor 10, a first determining unit 22 comparing the calculated standard deviation with a predetermined value set to determine complexity of the corresponding block, and a second determining unit 23 determining a damage degree of the corresponding block. Particularly, the standard deviation calculator 13 acquires a plurality of first blocks by dividing a with respect to each block with a predetermined value, and calculates a standard deviation for each of the first blocks.

The first determining unit 22 compares a standard deviation calculated for a first block with a set value. When the standard deviation is greater than the set value, the first determining unit 22 determines that texture of the corresponding block has first complexity. When the standard deviation is less than the set value, the first determining unit 22 determines that texture of the corresponding block has second complexity. Here, the first complexity and second complexity satisfy a relationship of the first complexity>the second complexity, and complexity of texture of the corresponding block is increased as the complexity value is increased.

In addition, when the standard deviation is less than the set value so that texture of the corresponding block is determined to have the second complexity, the second determining unit 23 determines a damage degree of the corresponding block.

For this purpose, the second determining unit 23 obtains a damage coefficient that indicates a damage degree of a block, compares the damage coefficient with first and second predetermined coefficients, and transmits a comparison result to the error recovery unit 30. Here, the first and second predetermined coefficients satisfy a relationship of the first predetermined coefficient>the second predetermined coefficient.

In further detail, the second determining unit 23 divides a first block into a plurality of second blocks by dividing the first block with a predetermined value, and obtains a damage coefficient (this may be referred to as a pixel of distorted (POD)) based on the number of pixels where an error occurs among pixels forming the second blocks. In addition, the second determining unit 23 compares the obtained damage coefficient with first and second damage coefficient.

The error recovery unit 30 performs an error recovery process according to complexity and a damage degree of each block. For this, the error recovery unit 300 includes a first recovery unit 31 that recovers an error-occurred region by using global pixel information, that is, the entire pixel information of the corresponding image, if a block has the first complexity, and second to fourth recovery units 32 to 34 that respectively perform error recovery based on local pixel information according to a damage degree of the corresponding block if a block has the second complexity.

The second recovery unit 32 recovers an error-occurred region based on local pixel information, that is, the entire pixel information of a first block, if the damage coefficient is greater than the first damage coefficient, and the third recovery unit 33 recovers an error-occurred region based on local pixel information, that is, pixel information of a second block, corresponding to a region divided by a predetermined value from the first block if the damage coefficient is less then the first damage coefficient and greater than the second damage coefficient. In addition, the fourth recovery unit 34 recovers an error-occurred region based on local pixel information, that is, information on neighbor pixels (NPs) of a pixel where an error has occurred if the damage coefficient is less than the second damage coefficient.

Here, a block including an error-occurred region, that is, an original block, may be referred to as a damaged image block (DIB), a first block divided by a first predetermined value from the DIB may be referred to as an image block (IB), and a second block divided by a second predetermined value from the IB may be referred to as a pixel block (PB). In addition, as described above, the global pixel information used for error recovery in the exemplary embodiment of the present invention indicates an average value of colors of the entire image, and particularly, indicates an average value of the entire pixels forming a damaged block (DB) including a damaged image. The local pixel information includes first local pixel information that is an average value of the entire pixels forming an IB acquired by dividing the DB, second local pixel information that is an average value of the entire pixels forming the PB acquired by dividing the IB, and third local pixel information that is a value of surrounding pixels of a pixel where an error has occurred.

Figure 2:
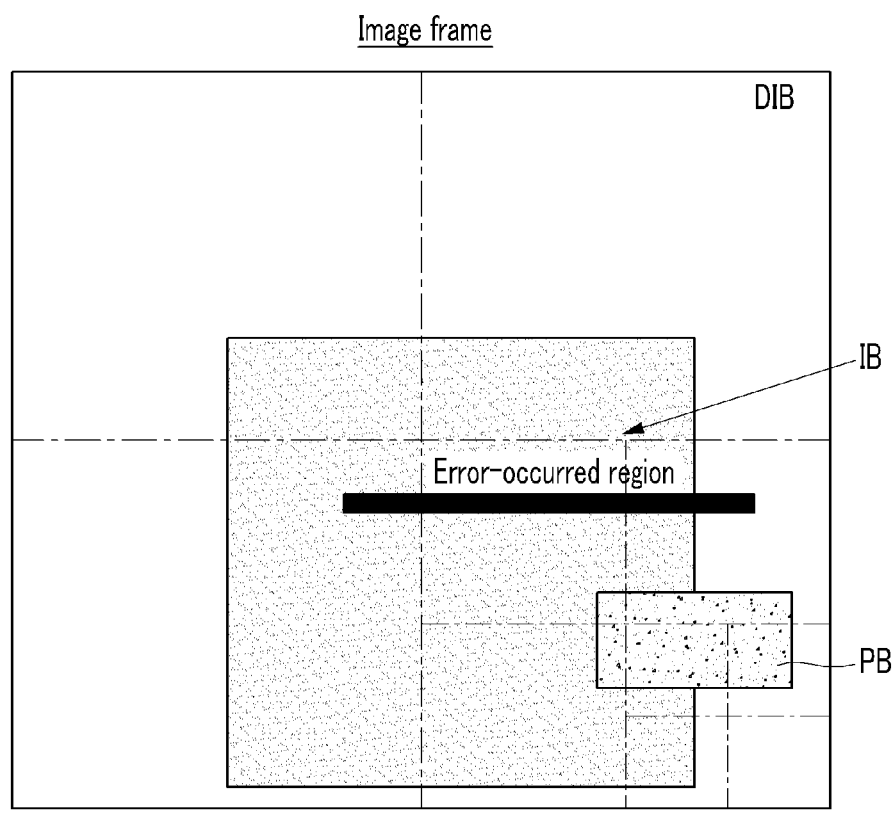
FIG. 2 is an example of a plurality of blocks divided from an image according to the exemplary embodiment of the present invention.

FIG. 2 exemplarily shows a case that an image is divided into the above-described blocks according to the exemplary embodiment of the present invention.

For example, one image frame is divided into 8×8 blocks so that a total of 64 blocks may be acquired. As shown in FIG. 2, each block, that is, a random DIB, is divided into 2×2 blocks to acquire an IB, and the IB is divided into 2×2 blocks to acquire a PB.

An error-occurred region recovering method of each of the respective recovery units 31 to 34 will now be described in further detail.

The transmission error restoring apparatus formed in the above-described structure may be applied to an IP-based communication system that provides an IP media service including images, and particularly, the apparatus is installed in an end terminal that receives an image transmitted from the communication system to restore an original image by recovering an error that has occurred in the image during transmission of the image.

Figure 3:
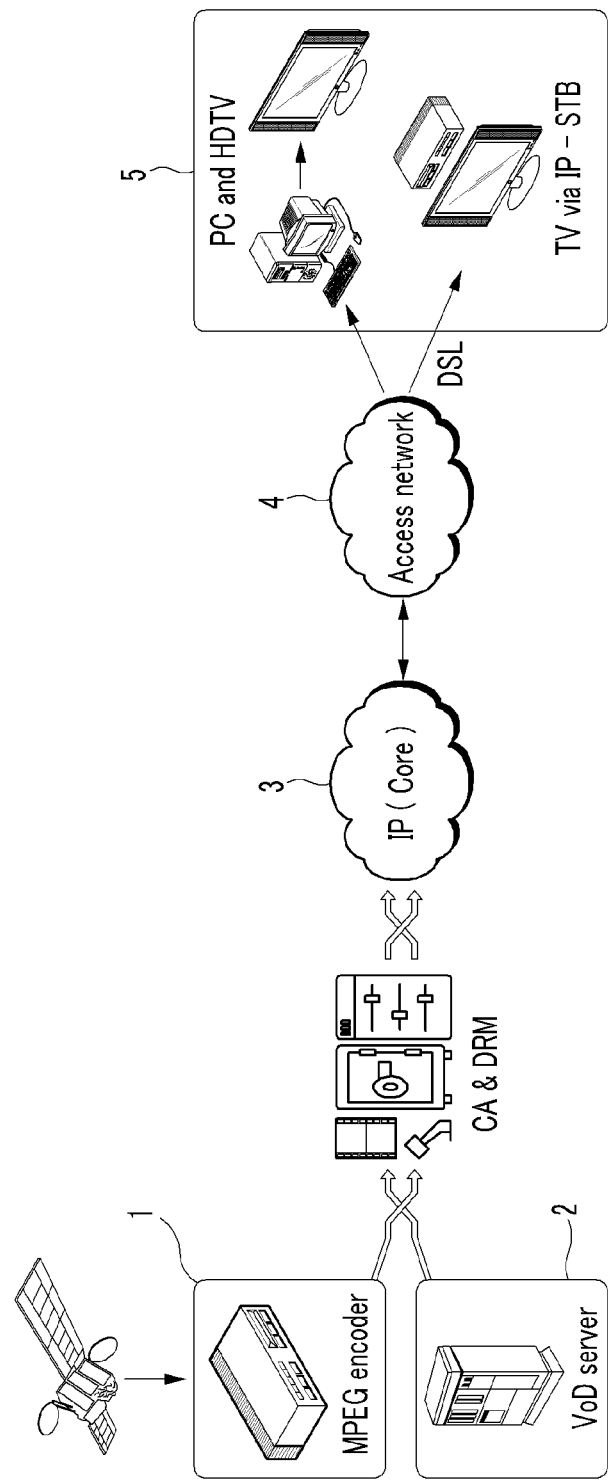
FIG. 3 is an example of a communication system environment to which the transmission error restoring apparatus according to the exemplary embodiment of the present invention is applied.

FIG. 3 is an example of a communication system environment to which the transmission error restoring apparatus according to the exemplary embodiment of the present invention is applied. Particularly, FIG. 3 schematically shows a transmission path from initial transmission of media from an IP network to a user at the end terminal.

As shown in FIG. 3, when an IP media service is provided, IP media contents including images are encoded through a moving picture experts group (MPEG) encoder 1 and transmitted to a video on demand (VoD) server 2, and the VoD server 2 transmits the encoded IP media contents to a set top box 5, which is an end terminal, through an IP core network 3 and an access network 4. The set top box 5 processes the received IP media contents and outputs the processed contents through an IPTV connected thereto.

Figure 4:
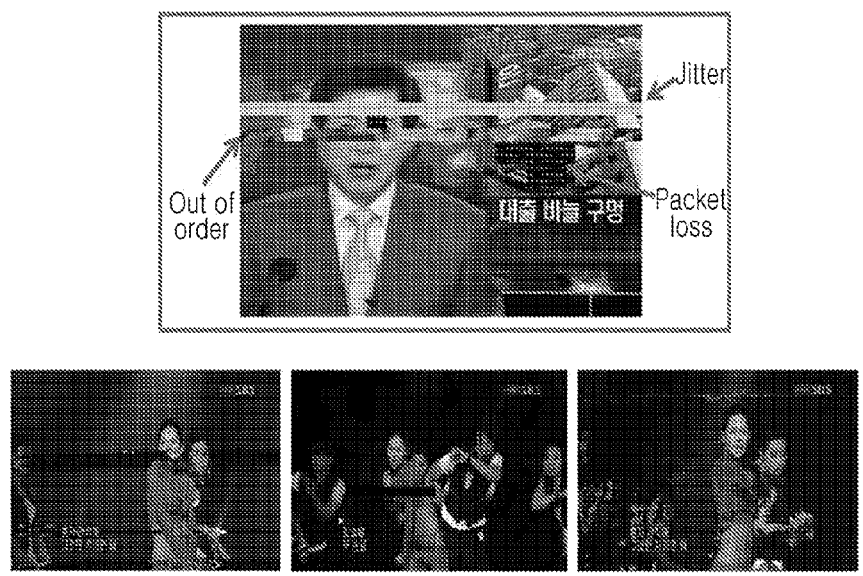
FIG. 4 is an example of errors included in a transmitted image.

In such an environment, errors such as a packet loss, jitter, or out of order occur during image transmission related to the IP media service, and the errors influence an image at the receiving end. FIG. 4 shows an example of an image including the errors.

In the exemplary embodiment of the present invention, the transmission error restoring apparatus 100 installed in the set top box 5, which is the end terminal, restores image errors such as a packet loss, jitter, or out of order included in the IP media contents as shown in FIG. 4.

The transmission error restoring apparatus recovers errors that have occurred in an image to restore an original image during transmission in a communication environment where the IP media service is provided in the present exemplary embodiment as shown in FIG. 3, but the present invention is not limited thereto.

A transmission error restoring method according to an exemplary embodiment of the present invention will now be described.

Figure 5:
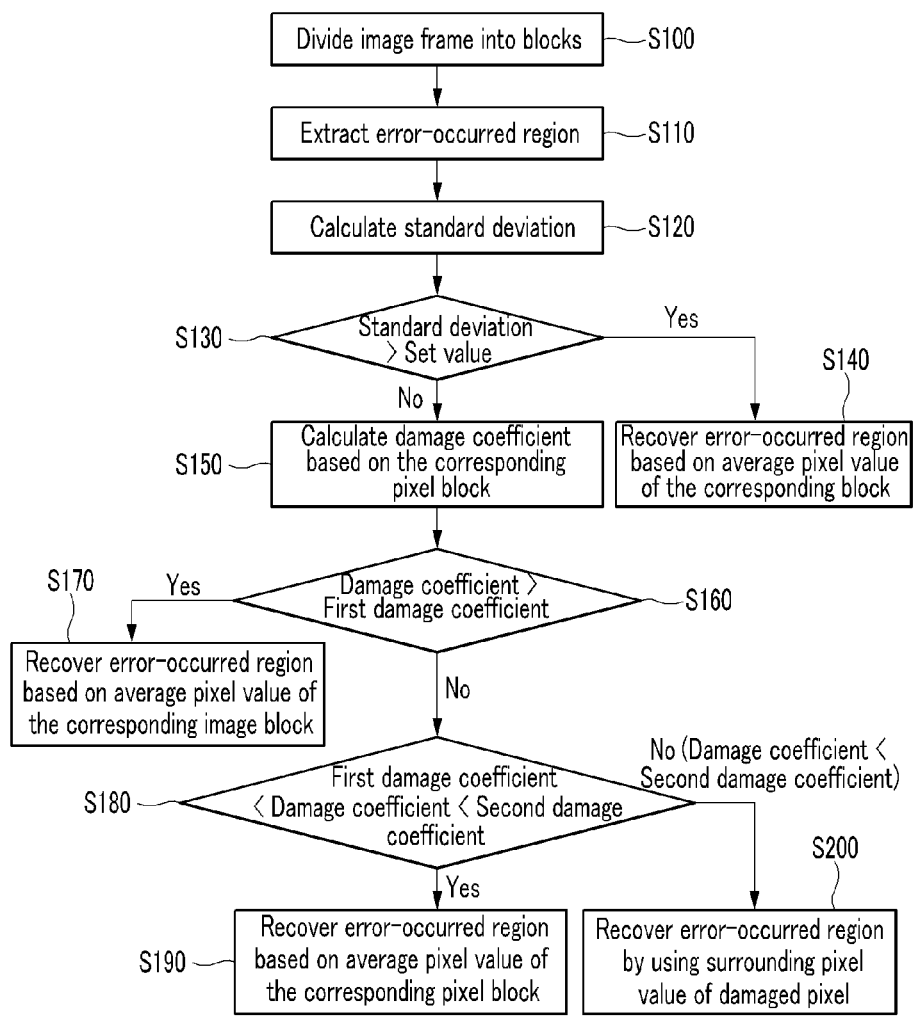
FIG. 5 is a flowchart of a transmission error restoring method according to an exemplary embodiment of the present invention.

FIG. 5 is a flowchart of a transmission error restoring method according to an exemplary embodiment of the present invention.

An image encoded and transmitted from a transmission side is received at a receiving side and then decoded, and for example, an image transmitted in accordance with the IP media service as shown in FIG. 3 is received at a set top box 5, which is an end terminal, through a transmission network (IP core network) and an access network, and decoded.

An error region extractor 10 of a transmission error restoring apparatus divides a frame of the decoded image to a plurality of blocks (S100). In further detail, an image frame is divided into blocks by dividing 8×8 multi-resolution, and accordingly, a distortion phenomenon due to a transmission error is divided and included in each block. The transmission error includes a block damage phenomenon, and also includes a blocking effect or blockiness, which is a general image quality degradation phenomenon. Due to the blocking effect or blockiness, discontinuity is generated in boundaries of neighbor blocks so that image deterioration occurs.

The error region extractor 10 searches for a region including the blocking effect or blockiness, that is, where an error has occurred (S110). A detailed method for the error-occurred region is shown in FIG. 6.

Figure 6:
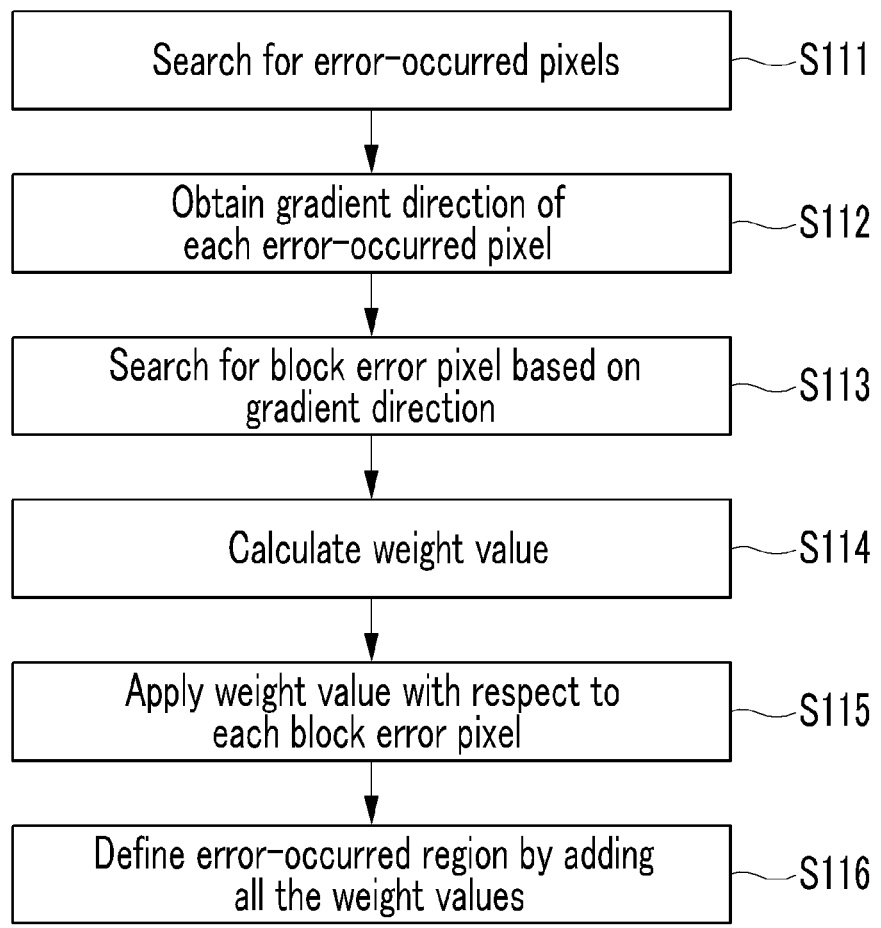
FIG. 6 is a flowchart of an error region extraction process in FIG. 5.

Referring to FIG. 6, in order to search for an error-occurred region in each block, edge pixels are searched for by using, for example, a Sobel mask in a random block (S111). A method for searching for an edge pixel by using the Sobel mask is well known to a person in the art, and therefore a detailed description will be omitted. Methods other than the method using the Sobel mask may be used for searching for edge pixels in a block.

After searching for the edge pixels in the random block, the error region extractor 10 calculates a gradient that indicates a variation rate of brightness by differentiating each of the edge pixels in vertical and horizontal directions, and obtains a gradient direction based on the calculated gradient (S112). In addition, among gradient directions of edge pixels, edge pixels of which gradient direction satisfies a predetermined direction are defined as block edge pixels (S113). For example, if the gradient directions are 0°, 90°, 180°, and 270°, edge pixels having the corresponding gradient direction are defined as block edge pixels. In addition, the following weight value is applied to the block edge pixels.

For applying the weight value, an average brightness value of surrounding pixels of a random block edge pixel is calculated. For example, an average brightness value of 8 surrounding pixels respectively located up, down, left, and right of the block edge pixel is calculated. In addition, an average brightness value of 8 surrounding pixels in the up and down direction (may referred to as a first direction) of the block edge pixel and an average brightness of the surrounding pixels in the left and right direction (may referred to as a second direction) of the block edge pixel are respectively calculated, and differences between the average brightness value of the 8 surrounding pixels and the average brightness values of the pixels in the first and second directions are obtained. That is, a first difference value between the average brightness value of the 8 surrounding pixels and the average brightness values of the pixels in the first direction and a second difference value between the average brightness value of the 8 surrounding pixels and the average brightness value of the pixels in the second direction are obtained. Then, a larger value among the first and second difference values is selected and normalized to be used as a weight value. For example, the selected difference value is normalized to 255 and is used as the normalized value as a weight value (S114). After obtaining weight values for the respective block edge pixels through the above-described process, the error region extractor 10 applies the weight values to the respective block edge pixels and adds all the applied weight values to set an error-occurred region (S115-S116). The error-occurred region may be defined by the blocking effect or blockiness that causes image quality degradation due to discontinuity at boundaries of neighbor blocks.

As described above, after finding an error-occurred region where the blocking effect or blockiness is generated, a recovery process for the error-occurred region is performed with reference to FIG. 5. Particularly, the error-occurred region is recovered by using a different method according to complexity of each block.

For this purpose, a determining unit 20 obtains a standard deviation of pixel values with respect to each IB of a DIB as shown in FIG. 5 (S120). Here, the standard deviation may be calculated as given in the following equation.

$$\sigma = \frac{1}{N-1} \sqrt{\sum_{(x,y) \in F} (I(x,y) - \mu)^2} \qquad \text{[Equation 1]}$$

Here, σ denotes a standard deviation, l(x,y) denotes a random pixel value, and μ denotes an average value of all pixels of a random block. The average value μ of the entire pixels may be calculated as given in the following equation.

$$\mu = \frac{1}{N} \sum_{(x,y) \in F} I(x,y) \qquad \text{[Equation 2]}$$

The calculated standard deviation and a predetermined value are compared (S130).

When the standard deviation is greater than the predetermined value, complexity of the corresponding block is determined to have a first complexity, and the determination result thereof is transmitted to the error recovery unit 30. In this case, a first recovery unit 31 of the error recovery unit 30 recovers the error-occurred region by using global pixel information rather than using local pixel information. That is, the first recovery unit 31 recovers the error-occurred region by using global pixel information of a DIB including the corresponding IB if the IB is determined to have great complexity. In further detail, an average value of the entire pixels of the DIB is obtained and pixels of error-occurred regions included in the IB are processed to have the obtained average value such that the error-occurred region is recovered (S140).

When the standard deviation is less than the predetermined value, the IB is determined to have second complexity, and a damage coefficient (POD) is obtained (S150). In further detail, the IB is divided into PBs (e.g., PBs are obtained by dividing the IB by 2×2), and the damage coefficient is obtained based on the entire number of pixels of the PBs and the number of damaged pixels in the PBs, that is, the number of pixels where an error occurs. For example, the damage coefficient is obtained by dividing the number of pixels where the error occurs among PBs with the entire number of pixels of the PBs. Here, the pixels where the error occurs may be found based on the above-obtained error-occurred region.

The damage coefficient is compared with first and second damage coefficients (S160). When the damage coefficient is greater than the first damage coefficient, a second recovery unit 32 obtains an average value of all pixels of the IB and recovers an error-occurred region based on the average value (S170).

When the damage coefficient is less than the first damage coefficient but greater than the second damage coefficient, a third recovery unit 33 obtains second local pixel information, that is, an average value of all pixels of the IB from which the damage coefficient is obtained, and recovers an error-occurred region based on the second local pixel information (S180).

When the damage coefficient is less than the second damage coefficient, a fourth recovery unit 34 recovers an error-occurred region by respectively compensating error-occurred pixels based on third local pixel information, that is, values of neighbor pixels of the error-occurred pixels. That is, the error-occurred pixels are compensated by using bilinear interpolation based on the neighbor pixels (NPs). For example, a distance between the error-occurred pixel and the surrounding pixels is obtained and the error-occurred pixel is recovered by performing interpolation based on the distance (S190).

According to the present exemplary embodiment, when a transmitted image is distorted, an error-occurred region where a blocking effect or blockiness has occurred in the image can be accurately found and restored. Particularly, an image frame is divided into a plurality of blocks and each block is divided through a multi-resolution process for accurate restoration of the error-occurred region, and then a random boundary value is compared and analyzed to determine complexity of the corresponding block. After the comparison and analysis, the divided blocks, that is, a damaged block (DIB), an image block (IB), and a pixel block (PB), are applied with a standard deviation value through application analysis of a global pixel value, a local pixel value, and a boundary value (i.e., value using surrounding pixels) to divide a damaged region, that is, an error-occurred region, into up, down, left, and right to thereby restore the error-occurred region with an average value of pixels.

Therefore, although a packet is lost during transmission so that original formation is lost, a distorted image can be restored to close to an original image by using information on existing pixels, that is, color information. The exemplary embodiment of the present invention can be applied to various errors in the real-time IPTV service, and for example, may be applied to a mobile IPTV having a maximum of 30 fps and resolution of a size of a quarter common intermediate format (QCIF) and a common intermediate format (CIF).

In addition, according to the embodiments of the present invention, an image service having high quality by restoring errors that have in an image during a transmission time at an end terminal of a communication system that transmits the image can be provided. Particularly, an image having high quality can be provided by efficiently restoring errors that have occurred during transmission through a transmission network and an access network. Particularly, a transmission error that has occurred in an image in an IP media service environment that provides an image in real-time can be efficiently restored.

In addition, a transmission error restoring method according to the exemplary embodiment of the present invention can be applied to a real-time broadcasting environment, and accordingly, accurate and fast restoring measurement can be supported for guaranteeing high quality of an IPTV service so that a quality-guaranteed service can be provided to a user.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An image error restoring method for restoring a transmission error included in a received image, comprising:
dividing a frame of the received image into a plurality of blocks and searching for an error-occurred region of each block;
determining complexity of texture of a block based on information of pixels forming the corresponding block, with respect to each block; and
selecting one of global pixel information and local pixel information based on the determined complexity of each block and recovering an error-occurred region included in a block based on the selected information, with respect to each block,
wherein the image frame is divided into a plurality of damaged blocks, each of the damaged blocks is divided into image blocks, and each of the image blocks is divided into pixel blocks, and
the determining of the complexity further comprises:
when the complexity is determined to be small because a standard deviation of pixels with respect to each image block is less than a set value, calculating a damage coefficient with respect to the image block; and
comparing the damage coefficient with first and second damage coefficients to determine a damage degree, and
wherein the recovering of the error-occurred region comprises:
when the damage coefficient is greater than the first damage coefficient, recovering the error-occurred region based on first local pixel information that is an average value of all pixels of the corresponding image block;
when the damage coefficient is less than the first damage coefficient and greater than the second damage coefficient, recovering the error-occurred region based on second local pixel information that is an average value of all pixels of a pixel block of the corresponding image block: and
when the damage coefficient is less than the second damage coefficient, recovering the error-occurred region based on third local pixel information that is values of neighbor pixels of error-occurred pixels.

2. The image error restoring method of claim 1, wherein the determining of the complexity comprises:
obtaining a standard deviation of pixels with respect to each image block;
comparing the standard deviation of an image block with a set value that is set for determining complexity of texture of a block;
determining complexity of the corresponding image block to be great when the standard deviation is greater than the set value; and
determining complexity of the corresponding image block to be small when the standard deviation is less than the set value.

3. The image error restoring method of claim 2, wherein the recovering of the error-occurred region recovers the error-occurred region based on the global pixel information if the complexity is determined to be great, and wherein the global pixel information corresponds to an average value of all pixels of a damaged block including the corresponding image block.

4. The image error restoring method of claim 2, wherein the determining of the complexity further comprises:
when the complexity is determined to be small, calculating a damage coefficient based on the entire number of pixels included in a pixel block of the corresponding image block and the number of error-occurred pixels included in the pixel block; and
comparing the damage coefficient with first and second damage coefficients to determine a damage degree.

5. The image error restoring method of claim 1, wherein the recovering the error-occurred region based on the third local pixel information recovers the error-occurred region by compensating error-occurred pixels with bilinear interpolation based on the values of the neighbor pixels.

6. An image error restoring method for restoring a transmission error included in a received image, comprising:
dividing a frame of the received image into a plurality of blocks and searching for an error-occurred region of each block;
determining complexity of texture of a block based on information of pixels forming the corresponding block, with respect to each block; and
selecting one of global pixel information and local pixel information based on the determined complexity of each block and recovering an error-occurred region included in a block based on the selected information, with respect to each block,
wherein the searching for the error-occurred region comprises:
searching for edge pixels in a block;
calculating a gradient of each of the edge pixels and obtaining a gradient direction based on the calculated gradient;
defining edge pixels whose gradient directions satisfy a set direction among the respective edge pixels as block edge pixels;
calculating a weight value for each of the edge pixels; and
searching for an error-occurred region by applying the calculated weight value to the block edge pixels,
wherein the calculating of the weight value comprises:
calculating an average brightness value of surrounding pixels of a random block edge pixel;
respectively calculating an average brightness value of surrounding pixels located in a first direction and an average brightness value of surrounding pixels located in a second direction of the block edge pixel;
calculating a first difference value that is a difference between an average brightness value of the entire surrounding pixels and the average brightness value of the surrounding pixels located in the first direction, and a second difference value that is a difference between the average brightness value of the entire surrounding pixels and the average brightness value of the surrounding pixels located in the second direction; and
calculating a weight value by selecting a large value among the first and second difference values and normalizing the selected difference value.

7. The image error restoring method of claim 6, wherein the searching for the error-occurred region sets an error-occurred value by applying a weight value with respect to each of the block edge pixels and adding all the applied weight values.

8. The image error restoring method of claim 1, wherein the transmission error restoring method recovers a transmission error included in an image transmitted in a communication environment where an IP media service is provided.

9. An apparatus for restoring a transmission error included in an image received at a communication environment where an IP media service is provided, wherein the apparatus is for embodying a non-transitory tangible computer-readable storage medium, comprising:

an error region extractor that divides a frame of the image into a plurality of damage blocks, divides each of the damage blocks into image blocks, divides each of the image blocks into pixel blocks, and searches for a region where an error has occurred in each of damaged blocks;
a determining unit that obtains a standard deviation of pixel values with respect to image blocks of each of the damaged blocks and determines complexity of the corresponding image block based on the standard deviation; and
an error recovery unit that selects one of global pixel information and local pixel information based on the complexity of each block and recovers an error-occurred region included in each of the image blocks based on the selected information,
wherein the determining unit, when the standard deviation is less than a set value, calculates a damage coefficient with respect to the image block and
compares the damage coefficient with first and second damage, and
the error recovery unit,
when the damage coefficient is greater than the first damage coefficient, recovers the error-occurred region based on first local pixel information that is an average value of all pixels of the corresponding image block,
when the damage coefficient is less than the first damage coefficient and greater than the second damage coefficient, recovers the error-occurred region based on second local pixel information that is an average value of all pixels of a pixel block of the corresponding image block, and
when the damage coefficient is less than the second damage coefficient, recovers the error-occurred region based on third local pixel information that is values of neighbor pixels of error-occurred pixels.

10. The transmission error restoring apparatus of claim 9, wherein the determining unit comprises:
a standard deviation calculator that calculates a standard deviation;
a first determining unit that compares the standard deviation with a set value that is set for determining complexity and determines complexity of the corresponding image block according to a comparison result; and
a second determining unit that calculates a damage coefficient of the corresponding image block when the standard deviation is less than the set value and determines a damage degree by comparing the damage coefficient with first and second damage coefficients.

11. The transmission error restoring apparatus of claim 10, wherein the damage coefficient is calculated by dividing the number of error-occurred pixels included in a pixel block of an with respect to each block image block with the entire number of pixels included in the pixel block.

12. The transmission error restoring apparatus of claim 10, wherein the error recovery unit comprises:
a first recovery unit that recovers an error-occurred region based on the global pixel information when the standard deviation is greater than the set value, the global pixel information corresponding to an average value of all pixels of a damage block where the corresponding image block is included;
a second recovery unit that recovers an error-occurred region based on local pixel information that is an average value of all pixels of the corresponding block when the standard deviation is less than the set value and the damage coefficient is greater than the first damage coefficient;
a third recovery unit that recovers an error-occurred region based on the local pixel information that is an average value of all pixels of a pixel block of the corresponding image block when the standard deviation is less than the set value and the damage coefficient is less than the first damage coefficient and greater than the second damage coefficient; and
a fourth recovery unit that recovers an error-occurred region based on local pixel information that is values of neighbor pixels of error-occurred pixels when the standard deviation is less than the set value and the damage coefficient is less than the second damage coefficient.

13. The transmission error restoring apparatus of claim 9, wherein the error region extractor comprises:
an edge pixel extractor that obtains edge pixels for each block;
a block edge measurer that obtains a gradient direction of edge pixels of each block and obtains block edge pixels based on the obtained gradient direction;
a weight value calculator that calculates average brightness of at least one surrounding pixel of the block edge pixels and calculates a weight value based on the average brightness; and
an error extractor that defines an error-occurred region by adding the calculated weight value to the block edge pixels.

* * * * *